US011541772B2

(12) United States Patent
Maeda et al.

(10) Patent No.: US 11,541,772 B2
(45) Date of Patent: Jan. 3, 2023

(54) SYSTEMS AND METHODS FOR CHARGING STATION MANAGEMENT (71) Applicant: Honda Motor Co., Ltd., Tokyo (JP)

(72) Inventors: Eri Izumi Maeda, Rancho Palos Verdes, CA (US); David Wong Cun, Fountain Valley, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 307 days.

(21) Appl. No.: 16/786,413

(22) Filed: Feb. 10, 2020

(65) Prior Publication Data
US 2021/0049518 A1 Feb. 18, 2021

Related U.S. Application Data (60) Provisional application No. 62/885,906, filed on Aug. 13, 2019.

(51) Int. Cl.
B60L 53/68 (2019.01)
G06Q 10/02 (2012.01)
G06Q 10/06 (2012.01)
G06Q 30/02 (2012.01)
G06Q 50/06 (2012.01)
B60L 53/63 (2019.01)
(Continued)

(52) U.S. Cl.
CPC ............ B60L 53/68 (2019.02); B60L 53/62 (2019.02); B60L 53/63 (2019.02); B60L 53/665 (2019.02); G06Q 10/02 (2013.01); G06Q 10/06315 (2013.01); G06Q 30/0213 (2013.01); G06Q 30/0226 (2013.01); G06Q 50/06 (2013.01); B60K 6/28 (2013.01); B60Y 2200/91 (2013.01); B60Y 2200/92 (2013.01); B60Y 2300/91 (2013.01); G06Q 2240/00 (2013.01)

(58) Field of Classification Search
CPC ...................................................... B60L 53/68
USPC ............................................................ 705/5
See application file for complete search history.

(56) References Cited

U.S. PATENT DOCUMENTS 9,779,365 B2  10/2017 Smullin et al.
10,001,798 B2  6/2018 Ukita et al.
(Continued)

FOREIGN PATENT DOCUMENTS

CN  105931383  4/2018
CN  108491942  9/2018
(Continued)

OTHER PUBLICATIONS

Office Action of U.S. Appl. No. 16/786,478 dated Oct. 12, 2021, 16 pages.
(Continued)

Primary Examiner — Jerry D Robbins
(74) Attorney, Agent, or Firm — Rankin, Hill & Clark LLP (57) ABSTRACT Systems and methods for managing usage of charging stations. In one embodiment, a system may include a request module, a membership module, and a schedule module. The request module receives a reservation request from an account associated with vehicle. The membership module determines a membership benefit associated with the reservation request. The membership benefit is based on a membership level of the account. The schedule module schedules a charging session based on the reservation request and the membership benefit.

19 Claims, 6 Drawing Sheets (51) Int. Cl.
  *B60L 53/66* (2019.01)
  *B60L 53/62* (2019.01)
  *B60K 6/28* (2007.10)

(56) References Cited

U.S. PATENT DOCUMENTS

| | | | |
|---|---|---|---|
| 10,169,783 B2 | 1/2019 | Khoo et al. | |
| 2010/0274656 A1* | 10/2010 | Genschel | B60L 53/80 705/14.27 |
| 2011/0153474 A1 | 6/2011 | Tormey et al. | |
| 2012/0197693 A1* | 8/2012 | Karner | B60L 50/20 705/14.1 |
| 2012/0296678 A1 | 11/2012 | Boot et al. | |
| 2013/0080254 A1* | 3/2013 | Thramann | B60L 53/68 705/14.57 |
| 2013/0211885 A1* | 8/2013 | Carpinteri | H02J 13/0003 705/14.1 |
| 2014/0207498 A1* | 7/2014 | Cho | G06Q 10/02 705/5 |
| 2015/0202975 A1* | 7/2015 | Solomon | H02J 13/0003 705/7.26 |
| 2017/0004712 A1* | 1/2017 | Yang | H04L 67/025 |
| 2019/0031037 A1 | 1/2019 | Fendt | |
| 2019/0070970 A1* | 3/2019 | Chan | B60L 53/67 |
| 2019/0095872 A1* | 3/2019 | Lalwani | G06Q 30/0633 |
| 2019/0139161 A1 | 5/2019 | Sakuma et al. | |
| 2019/0152340 A1 | 5/2019 | Haneda | |
| 2019/0381910 A1* | 12/2019 | Akhavan-Tafti | B60L 53/62 |

FOREIGN PATENT DOCUMENTS

| | | |
|---|---|---|
| CN | 108694856 | 10/2018 |
| CN | 106515494 | 3/2019 |
| CN | 110111211 | 8/2019 |
| IN | 201611014217 | 5/2016 |
| JP | 2018049447 | 3/2018 |
| KR | 20130037012 | 4/2013 |
| KR | 20180010375 | 1/2018 |
| WO | 2018081321 | 5/2018 |
| WO | 2019174949 | 9/2019 |

OTHER PUBLICATIONS

Chung, et al., Design of RFID Mesh Network for Electric Vehicle Smart Charging Infrastructure, Proceeding of the 2013 IEEE International Conference on RFID Technologies and Applications, Sep. 4-5, 2013 (Year: 2013).

Office Action of U.S. Appl. No. 16/786,478 dated Feb. 18, 2022, 14 pages.

Office Action of U.S. Appl. No. 16/786,478 dated Aug. 25, 2022, 16 pages.

* cited by examiner

SYSTEMS AND METHODS FOR CHARGING STATION MANAGEMENT

CROSS-REFERENCE TO RELATED APPLICATION

This application claims priority to U.S. Provisional Application Ser. No. 62/885,906 filed on Aug. 13, 2019, which is expressly incorporated herein by reference. Furthermore, this application is related to "SYSTEMS AND METHODS FOR PROVIDING RESERVED CHARGING SESSIONS," filed on Feb. 10, 2020, which is also expressly incorporated herein by reference.

BACKGROUND

Increasingly, vehicles are designed to be recharged using charging stations. For example, electric vehicles use an electric motor to provide all or part of the mechanical drive power of the vehicle. Some types of electric vehicle can be charged from an external source via a charging station. A plugin electric vehicle may include batteries which store power from the electric grid in an electrochemical cell. To facilitate charging of electric vehicles, charging stations are often positioned in parking structures and lots. While the number of available charging stations is increasing, typically, a parking lot or structure will only have a few parking spots that can access the charging stations.

BRIEF DESCRIPTION

According to one aspect, a system for managing usage of charging stations may include a request module, a membership module, and a schedule module. The request module is configured to receive a reservation request from an account associated with a vehicle. The membership module is configured to determine a membership benefit associated with the reservation request. The membership benefit is based on a membership level of the account. The schedule module is configured to schedule a charging session for the vehicle based on the reservation request and the membership benefit.

According to another aspect, a method for managing usage of charging stations is provided. The method includes receiving a reservation request from an account associated with a vehicle. The method also includes determining a membership benefit associated with the reservation request. The membership benefit is based on a membership level of the account. The method further includes scheduling a charging session for the vehicle based on the reservation request and the membership benefit.

According to a further aspect, a non-transitory computer readable storage medium storing instructions that when executed by a computer, which includes a processor to perform a method for managing usage of charging stations is provided. The method includes receiving a reservation request from an account associated with a vehicle. The method also includes determining a membership benefit associated with the reservation request. The membership benefit is based on a membership level of the account. The method further includes scheduling a charging session for the vehicle based on the reservation request and the membership benefit.

DETAILED DESCRIPTION

As discussed above, users may have to wait to access public charging stations for their vehicle. While users may charge their vehicles at home, installation, maintenance, and charge for charging stations may cost hundreds or thousands of dollars. To balance the inconvenience of relying on public charging stations with the cost of a personal charging station, charging sessions may be managed for a group of users, for example, in a time sharing program may. The time sharing program may be implemented as a system or as a method and/or across multiple charging stations. The time sharing program may be utilized to establish charging station timeshare management among a number of different users, ensuring that each user has access to a charging station.

According to one aspect, a user of a vehicle may submit a reservation request for a charging session. The reservation request is associated with an account. A membership level may be determined based on the reservation request or account. In this manner it can be determined if the user is a member. Furthermore, the membership may include membership levels that are associated with varying membership benefits. A charging session can then be scheduled for the vehicle of the user based on the reservation request and the associated membership benefits. For example, the systems and methods described herein may determine whether the membership level for the corresponding account has sufficient membership benefits to reserve the charging session being requested. If the membership level does not have sufficient membership benefits the reservation request may be denied, whereas the reservation request may be approved if the membership level does confer sufficient membership benefits. In this manner, the rights to charging station can be held by multiple users having a membership. The membership provides the users with scheduling options in which each user has priority to use their rights access the charging station.

Once the reservation request is made and approved, a notification may be transmitted to the account identifying a specific charging station may be transmitted to the user prior to the charging session. When the vehicle arrives at the charging station, the vehicle may be verified as the vehicle associated with the account.

Definitions

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect network (LIN), among others.

"Charging station," as used here, refers to an access point to an energy source that a vehicle can engage to receive a charge. Accordingly, the charging station is an element in an energy infrastructure capable of transferring energy, for example, from the grid to a vehicle. The charging station may include a connector to connect to the vehicle to the charging station. For example, the charge connector may include a range of heavy duty or special connectors that conform to the variety of standards, such as DC rapid charging, multi-standard chargers, and AC fast charging, etc.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication," as used herein, refers to a communication between two or more communicating devices (e.g., computer, personal digital assistant, cellular telephone, network device, vehicle, vehicle computing device, infrastructure device, roadside equipment) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wide-band (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface," as used herein can include input and/or output devices for receiving input and/or devices for outputting data. The input and/or output can be for controlling different vehicle features, which include various vehicle components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface, which can be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk, data store, and/or a memory.

"Data store," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Display," as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be accessible through various devices, for example, though a remote system. The display may also be physically located on a portable device, mobility device, or vehicle.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software-controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Station systems," as used herein can include, but is not limited to, any system that can be used to enhance the charge capability, use, and/or safety of a charging station. Exemplary station systems include, but are not limited to: a monitoring system, a vehicle identification system, a user detection system, communication system, a charge allocation system, a charge management system, a scheduling system, a sensory system, and a camera system among others.

A "user," as used herein can include, but is not limited to, one or more biological beings exerting a demand on a source of energy, such as an electrical grid. The user can be a driver or a passenger of a vehicle.

"Value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

"Vehicle," as used herein, refers to any moving vehicle powered wholly or partially by any form of rechargeable energy. The term "vehicle" includes, but is not limited to, cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle that is capable of carrying one or more users and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle. The autonomous vehicle can carry one or more users. Further, the term "vehicle" can include vehicles that are automated or non-automated with pre-determined paths or free-moving vehicles.

I. Systems Overview

Referring now to the drawings, the showings are for purposes of illustrating one or more exemplary embodiments and not for purposes of limiting the same. As discussed above, FIG. 1 is a parking area 100 including the charging station 102. The charging station 102 provides energy to vehicles, such as the vehicle 104, here shown in parking space 106.

Figure 1:
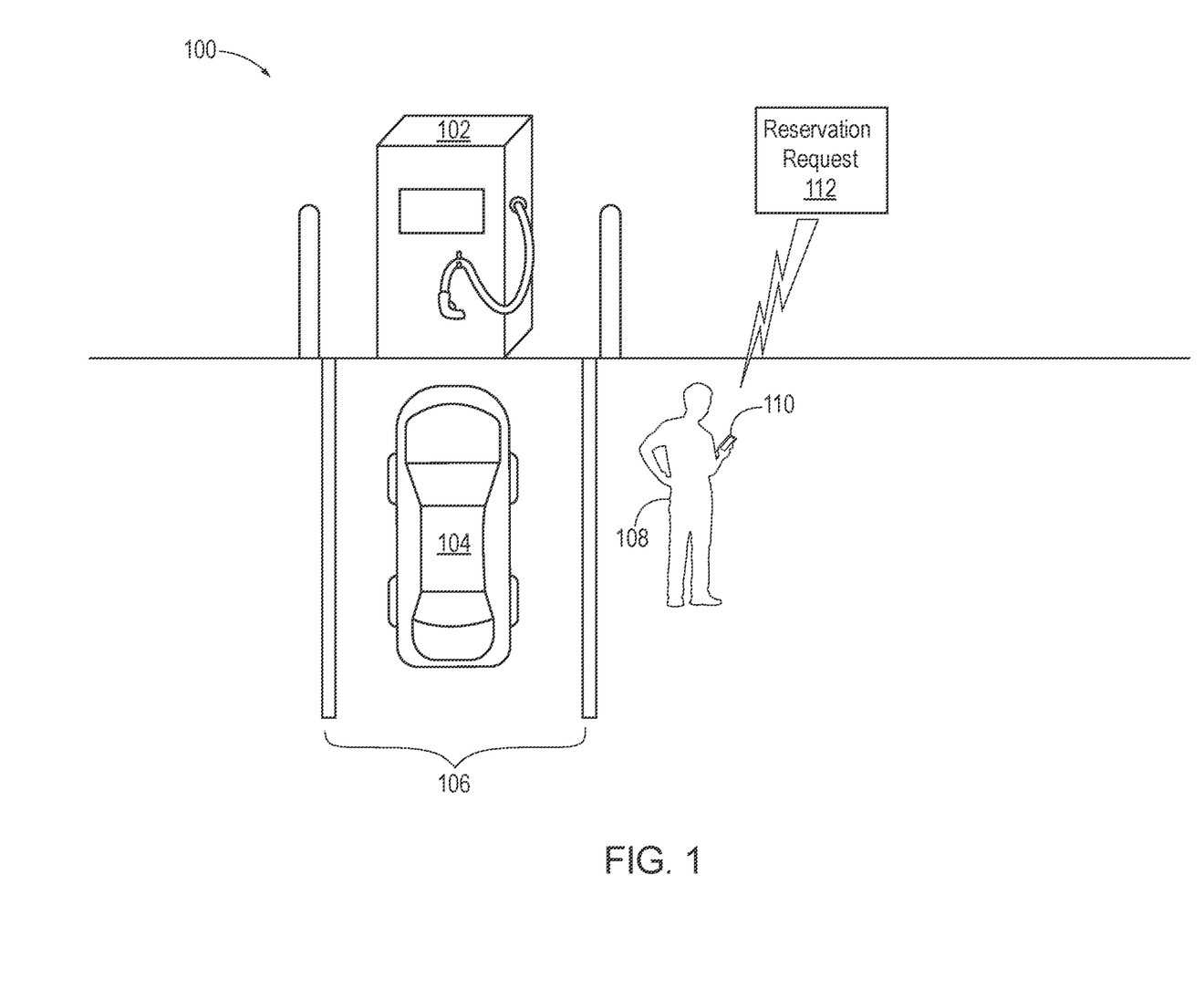
FIG. 1 is a schematic view of an exemplary parking area having a charging station, according to one embodiment.

In one or more embodiments, the charging station 102 may include charging equipment that may be installed in a private or public location for example, at a public (e.g., non-networked) or private (e.g., networked) charging station(s). The charging station 102 may include a charging station identification designation (e.g., identification number, serial number, alpha-numeric code, station name) that may be used to identify a particular charging stations. The charging station 102 may replenish the vehicle 104 using a charging energy source type that indicates the type of energy the charging station 102 provides. Energy may include clean renewable energy and non-renewable energy. Clean renewable energy may include, solar energy, hydro energy, biomass energy, wind energy, among others. Non-renewable energy may include electricity from a grid source supplied by one or more utility providers, and in the case of hybrid vehicles, fossil fuels.

In one or more configurations, the vehicle 104 may be capable of being fast charged based on fast charging components (not shown) that may be operably connected to the vehicle 104. Fast charging may enable the vehicle 104 to be charged at one or more charging speed tiers that provide a higher charging power (e.g., voltage, power, etc.) than a default charging speed tier or a slower charging speed tier. In some cases, the charging station 102 may include fast charging electric charging equipment (not shown) that may be facilitate the charging of the vehicle 104 at the one or more charging speed tiers.

In particular, the charging station 102 may provide one or more charging speed tiers that provide a default charging speed (e.g., where a default amount of charging power is provided to charge the vehicle 104 at a default charging speed) and/or one or more levels of fast charging speeds at one or more charging voltages. For example, one or more fast charging speed tiers may provide one or more levels of fast charging from a default charging speed tier or one or more slower charging speed tiers that may provide slower charging at one or more lower charging voltages (e.g., increase from 240 volts to 480 volts) to more quickly charge the vehicle 104 to a particular desired state of charge level (SOC). Accordingly, during utilization of one or more fast charging speed tiers.

One or more charging station entities (e.g., charging station corporate owner/operator) that may include utility providers, fuel providers, and/or entities that own and/or operate one or more various types of charging stations, fuel stations, energy stations, and the like and/or the charging station 102 may thereby provide respective pricing schemes that may pertain to the utilization of one or more respective charging speed tiers. Accordingly, each charging speed tier from a default charging speed tier to one or more fast charging speed tiers may be associated with a respective pricing schemes. As discussed below, the pricing schemes that may be associated with one or more charging speed tiers may be dynamically determined based on one or more factors.

In some embodiments, a user 108, associated with the vehicle 104, may also occupy the parking area 100. The user 108 user may be a vehicle occupant of the vehicle 104. In another embodiment, the user 108 may be remotely located from the vehicle 104. For example, the vehicle 104 may have autonomously driven to the parking area 100 while the user 108 remains at a distant location, such as a residence (not shown).

The user 108 may also have a portable device 110, such as a phone. The user 108 may access an operating environment 200, shown in FIG. 2, for managing the usage of charging stations, such as the charging station 102, using the vehicle 104 or the portable device 110. For example, the user 108 may transmit a reservation request 112 for charging the vehicle 104 from the portable device 110 to the operating environment 200.

Figure 2:
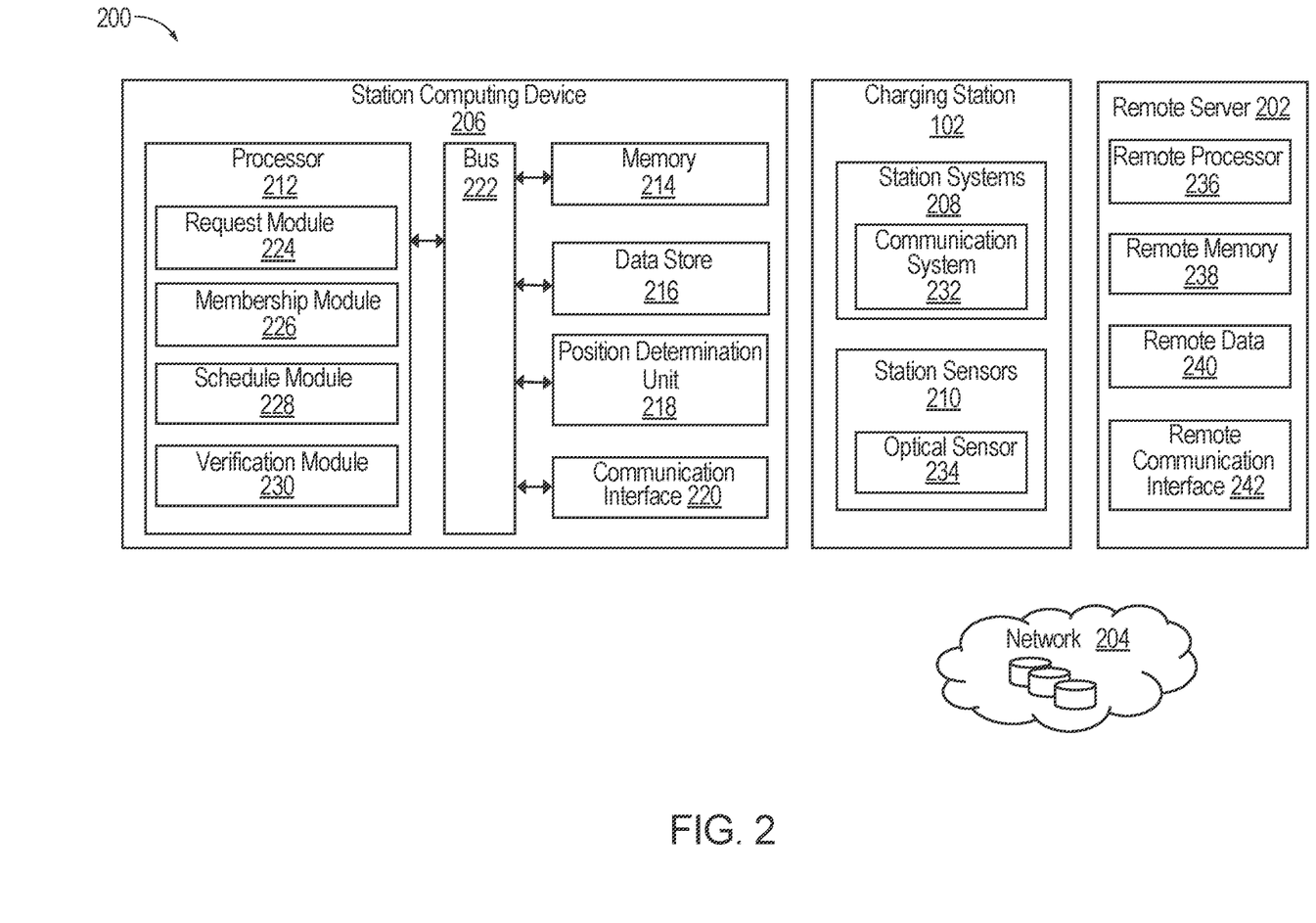
FIG. 2 is a block diagram of an operating environment for managing usage of charging stations, according to an exemplary embodiment.

FIG. 2, a block diagram of the operating environment 200 for managing usage of charging stations according to an exemplary embodiment. One or more of the components of the operating environment 200 can be considered in whole or in part a vehicle communication network. The charging station 102 communicates with a remote server 202 over a network 204 and a station computing device (SCD) 206. The SCD 206 may be provided at the charging station 102, the remote server 202, or other remote location operably connected to the charging station 102 and/or the remote server 202 via the network 204. Station systems 208 and station sensors 210 communicate information about the charging station 102 to the SCD 206.

Generally, the SCD 206 includes a processor 212, a memory 214, a data store 216, a position determination unit 218, and a communication interface 220, which are each operably connected for computer communication via a bus 222 and/or other wired and wireless technologies defined herein. The SCD 206, can include provisions for processing, communicating, and interacting with various components of the charging station 102 and other components of the operating environment 200. As discussed above, the SCD 206 can be implemented with the charging station 102, for example, as part of a telematics unit, a head unit, an infotainment unit, an electronic control unit, an on-board unit, or as part of a specific control system, among others. In other embodiments, the SCD 206 can be implemented remotely from the charging station 102, for example, with a portable device 110 or the remote server 202, connected via the network 204.

The processor 212 can include logic circuitry with hardware, firmware, and software architecture frameworks for remote control of the charging station 102 by multiple user 108s. Thus, in some embodiments, the processor 212 can store application frameworks, kernels, libraries, drivers, application program interfaces, among others, to execute and control hardware and functions discussed herein. For example, the processor 212 can include a request module 224, a membership module 226, a schedule module 228, and a verification module 230 although the processor 212 can be configured into other architectures. The memory 214 and/or the data store 216 may store data about the charging station 102. Further, in some embodiments, the memory 214 and/or the data store 216 can store similar components as the processor 212 for execution by the processor 212.

The modules of the processor 212 may access the position determination unit 218 via the bus 222. The position determination unit 218 can include hardware (e.g., sensors) and software to determine and/or acquire position data about the vehicle 104. For example, the position determination unit 218 can include a global positioning system (GPS) unit (not shown) and/or an inertial measurement unit (IMU) (not shown). Thus, the position determination unit 218 can provide a geo-position of the vehicle 104 based on satellite data from, for example, a global position source (not shown), or from any Global Navigational Satellite infrastructure (GNSS), including GPS, Glonass (Russian) and/or Galileo (European). Further, the position determination unit 218 can provide dead-reckoning data or motion data from, for example, a gyroscope, accelerometer, magnetometers, among others.

The communication interface 220 can include software and hardware to facilitate data input and output between the components of the SCD 206 and other components of the operating environment 200, the vehicle 104, and/or the portable device 110. Specifically, the communication interface 220 can include network interface controllers (not shown) and other hardware and software that manages and/or monitors connections and controls bi-directional data transfer between the communication interface 220 and other components of the operating environment 200, the vehicle 104, and/or the portable device 110 using, for example, the network 204.

Referring again to the charging station 102, the station systems 208 can include any type of vehicle control system and/or vehicle described herein to enhance the charging station 102 and/or safety of the charging station 102. Here, the station systems 208 may include a communication system 232. The communication system 232 may facilitate communication from the charging station 102 and access the communication protocols of other entities. For example, when communicating with the vehicle 104, the communication system 232 may determine a media access control (MAC) address of the vehicle 104.

The station sensors 210, which can be implemented with the station systems 208, can include various types of sensors for use with the charging station 102 and/or the station systems 208 for detecting and/or sensing a parameter of the charging station 102, the station systems 208, charging information, and/or the environment surrounding the charging station 102. For example, the station sensors 210 can provide charging information about the current charge state of the charging station 102. The station sensors 210 can include, but are not limited to proximity sensors, vision sensors, motion sensors, environmental sensors, and charge sensors, among others. The station sensors 210 can be any type of sensor, for example, acoustic, electric, environmental, optical, imaging, light, pressure, force, moisture, thermal, temperature, proximity, among others. As one example, the station sensors may include an optical sensor 234.

Using the system and network configuration discussed above, the SCD 206 may manage charging sessions for the vehicle 104. In particular, the SCD 206 may manage the charging station 102, such that the SCD 206 sets the schedule, the rate, etc. for accessing the charging station 102. For example, the charging station 102 may be operably connected for computer communication with the vehicle 104, the additional electric vehicles (not shown), the SCD 206, and/or the remote server 202, for example, to transmit and receive data (e.g., charge parameters, charging data and feedback, vehicle system data, reservation request 112, a reservation interface, as will be discussed below) to and from the vehicle 104, any additional vehicles, the remote server 202 and/or the SCD 206. For example, the communication interface 220 and or the communication system 232 may be a wired or wireless link to the charging station 102. In one embodiment, the vehicle 104, additional vehicles, the charging station 102, the remote server 202 and/or the SCD 206 may be operably controlled to initiate or terminate charging of the vehicle 104 from the charging station 102 based on the systems and methods for management of charging station use as described herein.

In an exemplary embodiment, the vehicle 104, the charging station 102, additional vehicles, and/or the remote server 202 may receive and transmit data through the network 204 to the SCD 206. The SCD 206 may include one or more computing devices (not shown) that may communicate with one or more charging station entities.

Furthermore, the SCD 206 may confer membership benefits associated with the user 108, by virtue of a membership, as will be discussed below. By scheduling the charging station 102, setting the rates, etc., the SCD 206 may manage timeshares of the charging station 102 for a plurality of users including the user 108. Detailed embodiments describing exemplary methods using the system and network configuration discussed above will now be discussed in detail.

II. Methods for Charging Station Management

Figure 3:
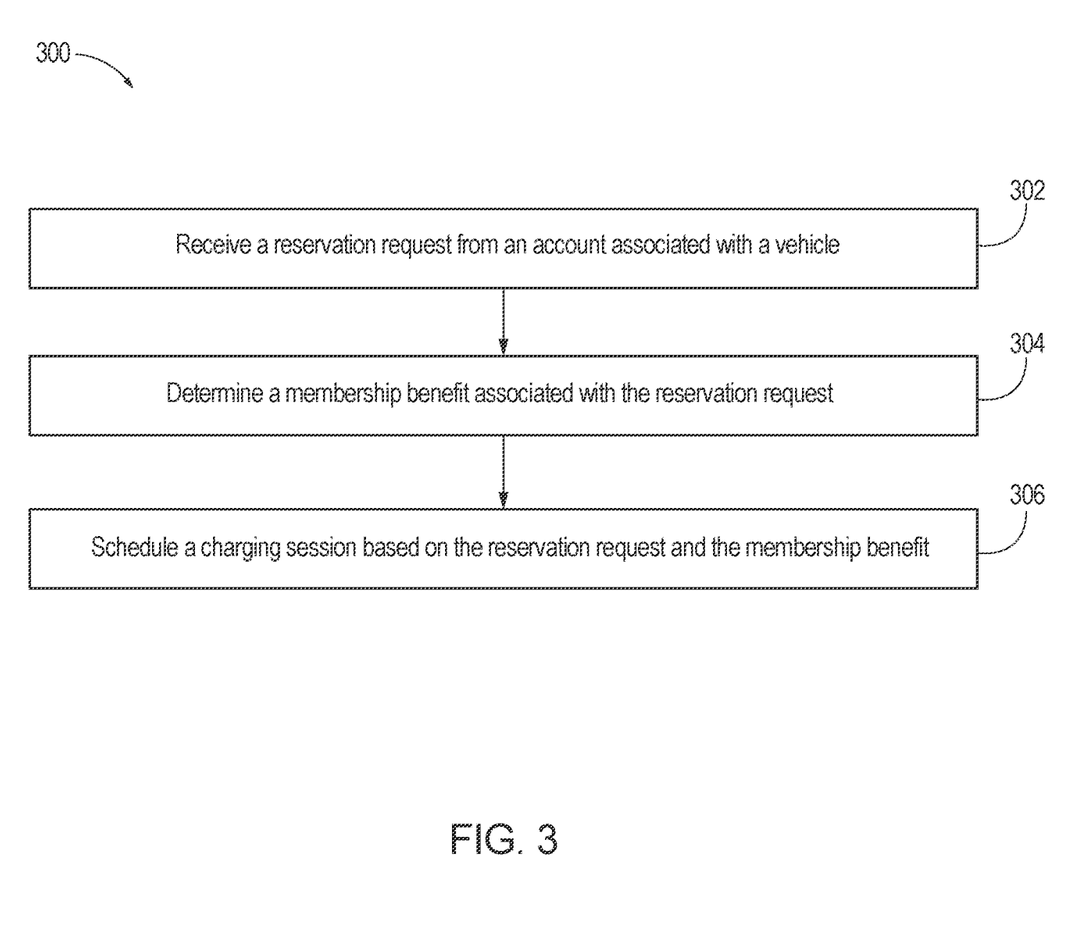
FIG. 3 is a process flow for managing usage of charging stations, according to one embodiment.

Referring now to FIG. 3, a method 300 for managing usage of charging stations is provided according to an exemplary embodiment. FIG. 3 will be described with reference to FIGS. 1, 2, and 4. As shown in FIG. 3, the method 300 can be described by a number of steps. For simplicity, the method 300 will be described by these steps, but it is understood that the steps of the method 300 can be organized into different architectures, blocks, stages, and/or processes.

At block 302 the method 300 includes receiving a reservation request 112 from an account 402 associated with the vehicle 104. The request module 224 receives the reservation request 112 for the vehicle 104 and/or one or more additional vehicles (not shown). In one embodiment, the reservation request 112 may be made by virtue of a reservation interface of the request module 224. The reservation interface may be utilized by the user 108 to submit a reservation request 112 for the vehicle 104 to access the charging station 102.

The reservation request 112 may include a desired time, place, specific charging station, for charging of the vehicle 104. In some embodiments, the reservation request 112 may include a proposed charging session 112 that the user 108 selects for the vehicle 104. In another embodiment, the reservation request 112 may include a map defining an area in which the user 108 would like to charge the vehicle 104. Accordingly, rather that identifying a specific place or charging station, the user 108 may select an area having one or more charging stations. The reservation request 112 may also indicate a primary charging preference for a first time and a first place and a secondary charging preference for a second time and a second place. Thus, if the primary charging preference is unavailable, the second charging preference is included in the reservation request 112.

The user 108 of the vehicle 104 may use a display (not shown) of the vehicle 104 and/or the portable device 110 as an input device for the reservation interface. The reservation interface may present the current utilization of the charging station 102 to indicate the availability and/or wait times that may be applicable with respect to the charging of the vehicle 104 and/or one or more other vehicles. In some embodiments, the reservation interface may allow the user 108 to select an available charging session. The reservation interface may also identify the charging station 102 as well as other charging stations that the user 108 may select from in the reservation request 112.

Figure 4:
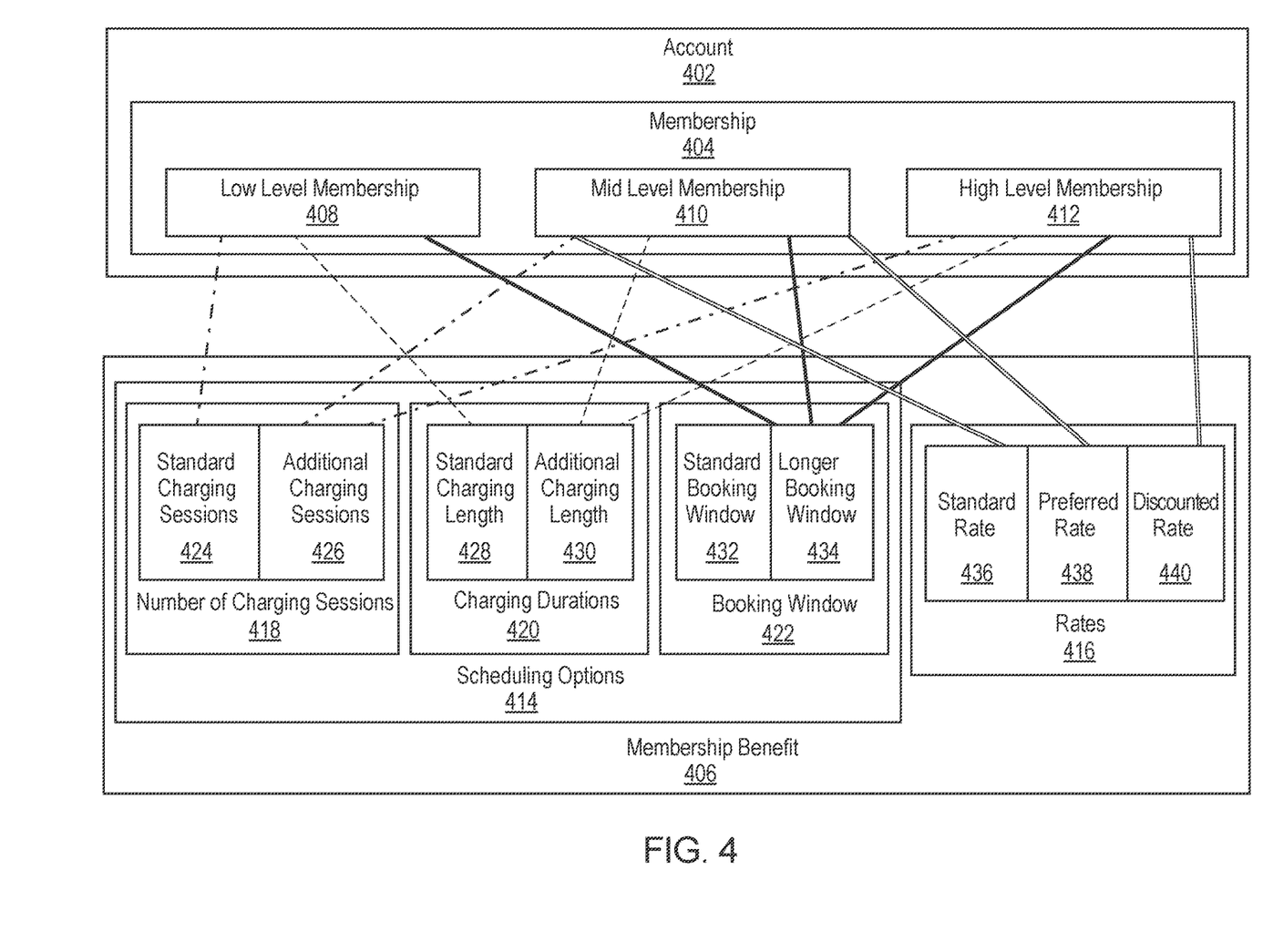
FIG. 4 is an example membership diagram for managing usage of charging stations, according to one aspect.

Turning to FIG. 4, the reservation request 112 may be generated by accessing the account 402 associated with the user 108. For example, the reservation interface may be accessed via the account 402. The account 402 is associated with a membership 404 of the user 108. The membership 404 confers at one membership benefit 406 to the user 108 that may allow the user 108 to take advantage to generate the reservation request 112.

In some embodiments, the membership 404 is binary and confer the membership benefit 406 merely by virtue of the account 402 being associated with membership 404. For example, the membership 404 may be purchased by the user. The membership 404 may also be based on a retail purchase, a timeshare purchase, an incentive, a relationship with an entity, a loyalty program, or a number of points that can be redeemed, among others. In another embodiment, the membership 404 may include a plurality of membership levels that are associated with different membership benefits of the membership benefits 406. For example, here the membership 404 may include a low level membership 408, a mid-level membership 410, and a high level membership 412. While three membership levels are shown, the membership 404 may include more or fewer membership levels. Furthermore, the membership levels may be arranged in tiers.

In one embodiment, the purchase of the timeshare may include the membership 404. Users, such as the user 108, with the membership 404 may hold rights to use the charging station 102. In some embodiment, the purchase may include purchasing a number of points in the timeshare program that can be redeemed in order to schedule a charging session. For example, suppose that the user has a set of points. A subset of the points may be redeemed at or for a predetermined membership level to confer a desired membership benefit.

At block 304 the method 300 includes determining a membership benefit associated with the reservation request 112. As discussed above, the different levels of the membership 404 may confer different membership benefits of the membership benefits 406 relative to scheduling options 414 and rates 416. The scheduling options 414 may include the number of charging sessions 418 that the user 108 is entitled to, the charging duration 420, and the booking window 422 during which the request module 224 can receive the reservation request 112. Within the scheduling options 414 and the rates 416 may have different tiers. For example, the number of charging sessions 418 may include a standard number of charging sessions 424 and an additional charging sessions 426. The charging durations 420 may include a standard charging length 428 and an additional charging length 430. Likewise, the booking window 422 may include a standard booking window 432 and a longer booking window 434. The rates 416 may also have different tiers including a standard rate 436, a preferred rate 438, and the discounted rate 440.

Suppose that the account 402 of the user 108 is associated with the low level membership 408. The user 108 may be able to make the standard number of charging sessions 424, the standard charging length 428, and the standard booking window 432. For example, the standard number of charging sessions 424 may allow the user 108 to schedule three charging sessions per week. The standard charging length 428 may allow the vehicle 104 to be charged by the charging station 102 for a predetermined amount of time, such as six hours. The standard booking window 432 may allow the user to transmit the reservation request 112 a predetermined amount of time before the requested charging session. For example, the standard booking window 432 may allow a reservation request 112 to be received by the request module one week in advance. A longer booking window 434 may allow the user 108 to book a charging session before other users. For example, the user 108 may be able to submit a reservation request 112 two weeks in advance.

The different levels of the membership 404 may also correspond to different rates of the rates 416 that indicate the cost for charging the vehicle at the charging station 102 for the charging session. In one embodiment, the rates 416 may be the cost per kWh. The low level membership 408 may be afforded a standard rate 436. The mid-level membership 410 may correspond to a preferred rate 438. The preferred rate 438 may be more advantageous than the standard rate 436. The high level membership 412 may correspond to a discounted rate 440. The discounted rate 440 may be more advantageous than the standard rate 436 or the preferred rate 438. Accordingly, the rates may change with the membership levels.

In some embodiments, the remote memory 238 of the remote server 202 may be configured to store data files associated with one or more applications, operating systems, vehicle systems, subsystem user interfaces, including but not limited to data files for charging station management, such as a time sharing program. In one configuration, the remote memory 238 may include respective records of the charging station 102 that may be owned and/or operated by one or more charging station entities. In one configuration, the remote memory 238 may be updated based on charging information communicated from the remote communication interface 242 and parsed by the remote processor 236.

In one configuration, the remote data 240 may be updated based on charging information communicated from the remote communication interface 242 and parsed by the remote processor 236. The remote data 240 may include records that may pertain to the charging station 102 and their respective geo-locations (GPS/DGPS coordinates) which may be determined by the position determination unit 218. Additionally, the remote server 202 may include one or more such as pricing schemes, charging protocols, or voltage pattern that may be implemented by the charging station 102 and that are associated with one or more membership levels and/or membership benefits 406. Each record may be identified based on the charging station identification designation (e.g., identification number, serial number, alpha-numeric code, station name) that may be used to identify one or more respective charging stations.

At block 306 the method 300 includes scheduling a charging session based on the reservation request 112 and the membership benefit 406. For example, suppose that the account 402 is associated with a mid-level membership 410, and at block 304 the corresponding membership benefit of the membership benefits 406 is determined. Accordingly, at block 306 a charging session is scheduled. The scheduled charging session may be the fourth scheduled charging session but be accepted as additional charging sessions 426. Likewise, the reservation request 112 may be for charging session that is six to eight hour time slot corresponding to the additional charging length 430 rather than a shorter standard charging length 428. Furthermore, the reservation request 112 may be made two weeks before the scheduled charging session given the longer booking window 434. Moreover, the scheduled charging session may be charged at the preferred rate 438. Accordingly, the charging session is scheduled according to the determined membership benefits.

In this manner, the schedule module 228 may communicate the membership benefits 406 to the charging station 102, the vehicle 104, the portable device 110 and/or the remote server 202. The schedule module 228 may be further configured to actuate charging of vehicle 104 at the scheduled charging session according to the membership benefits 406. Accordingly, the charging station 102 may supply a charge based on the membership benefits 406.

Figure 5:
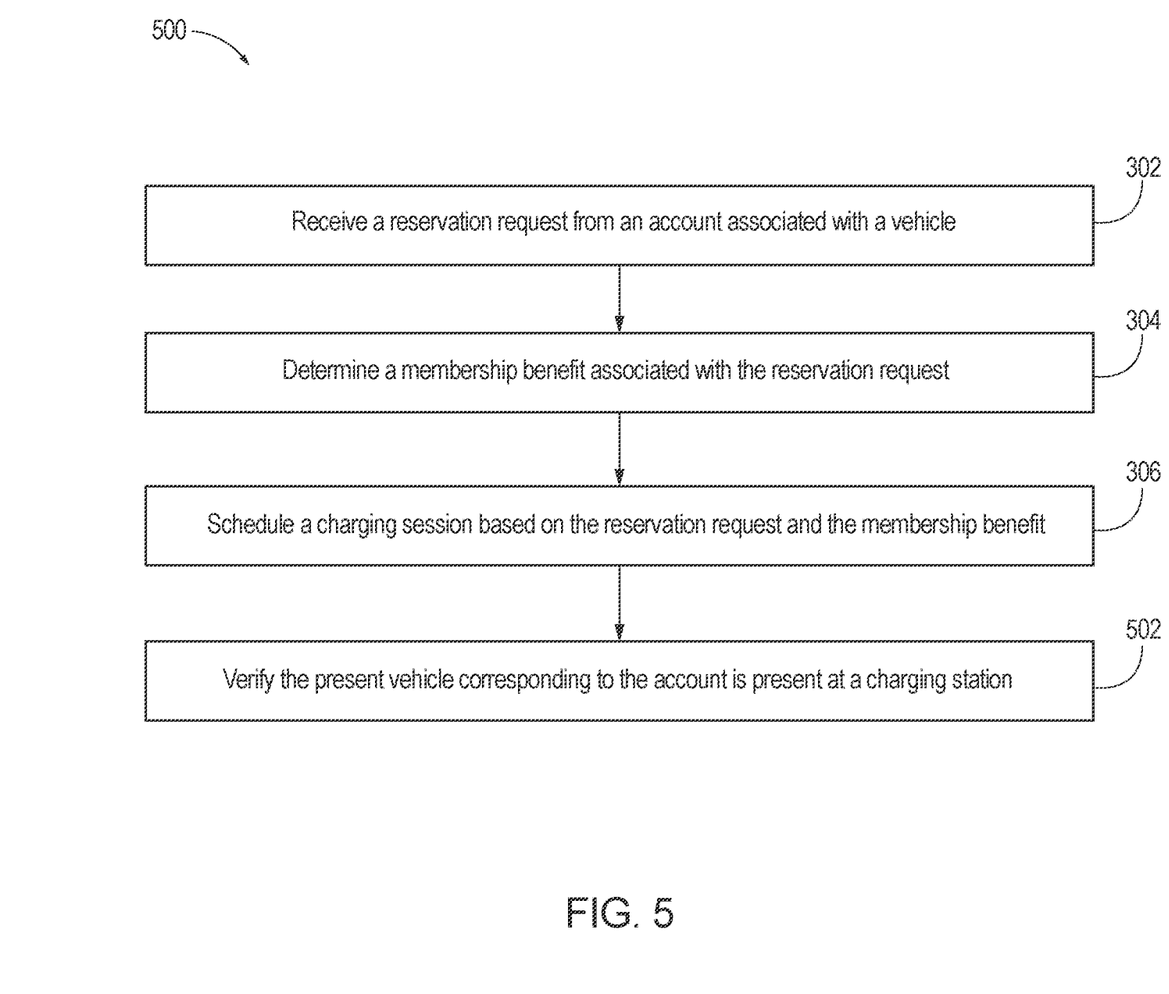
FIG. 5 is another process flow for managing usage of charging stations, according to one embodiment.

Referring now to FIG. 5, a method 500 for managing usage of charging stations using verification is provided according to an exemplary embodiment. FIG. 5 will be described with reference to FIGS. 1-4. As shown in FIG. 5, the method 500 can be described by a number of steps. For simplicity, the method 500 will be described by these steps, but it is understood that the steps of the method 500 can be organized into different architectures, blocks, stages, and/or processes.

In particular, the method 500 includes block 302, block 304, and block 306 that operate in a similar manner as described above with respect to the method 300 of FIG. 3 as discussed above. Additionally, the method 500 includes block 502, the verification module 230 verifies the vehicle 104 corresponding to the account 402 is present at a charging station 102 corresponding to the charging session to ensure that the vehicle 104 that was scheduled is the present vehicle at the charging station 102.

In some embodiments, the account 402 may include charging data with that may identify or can be used to identify the vehicle 104. For example, the vehicle 104 may be associated with a charging profile that includes charging data, including at least one charging parameter, specific to the vehicle 104. Generally, the charging data may be comprised of specific charging parameters associated with the vehicle 104 to receive a charge, such as the current level of charge of the corresponding vehicle, a desired level of charge of the corresponding vehicle, a rate of consumption, historical charging data, a cost to charge the corresponding vehicle, total consumption by the corresponding vehicle, scheduling of the corresponding vehicle, charging credentials, the length of the cable, average time to charge the corresponding vehicle based on level of charge, the draw of the corresponding vehicle on the charging station 102, and patterns of voltage variation in the draw down process, physical attributes of the vehicle 104, among others.

In some embodiments, verifying the vehicle 104 corresponding to the account 402 is present at a charging station 102 corresponding to the charging session may be based on a comparison. For example, the station systems 208 and/or the station sensors 210 may identify present charging data associated with the vehicle 104. In one embodiment the optical sensor 234 of the station sensors 210 may capture image data associated with the vehicle 104. In another embodiment, the present charging data may receive from the remote server 202, the portable device 110, infrastructure from the parking area 100, or from the present vehicle.

The verification module 230 compares the charging data from the account 402 to the present charging data. Suppose that the account is associate with a MAC address of the vehicle 104. The verification module 230 may receive the MAC address of the present vehicle via the communication system 232. If the MAC address associated with the account 402 is the same as the MAC address received from present charging data for the vehicle present at the charging station 102 for the charging session, then the scheduled vehicle 104 and the present vehicle are the same. If the MAC address associated with the account 402 is different that the MAC address received from present charging data for the vehicle present at the charging station 102 for the charging session, then the scheduled vehicle 104 and the present vehicle are different.

Figure 6:
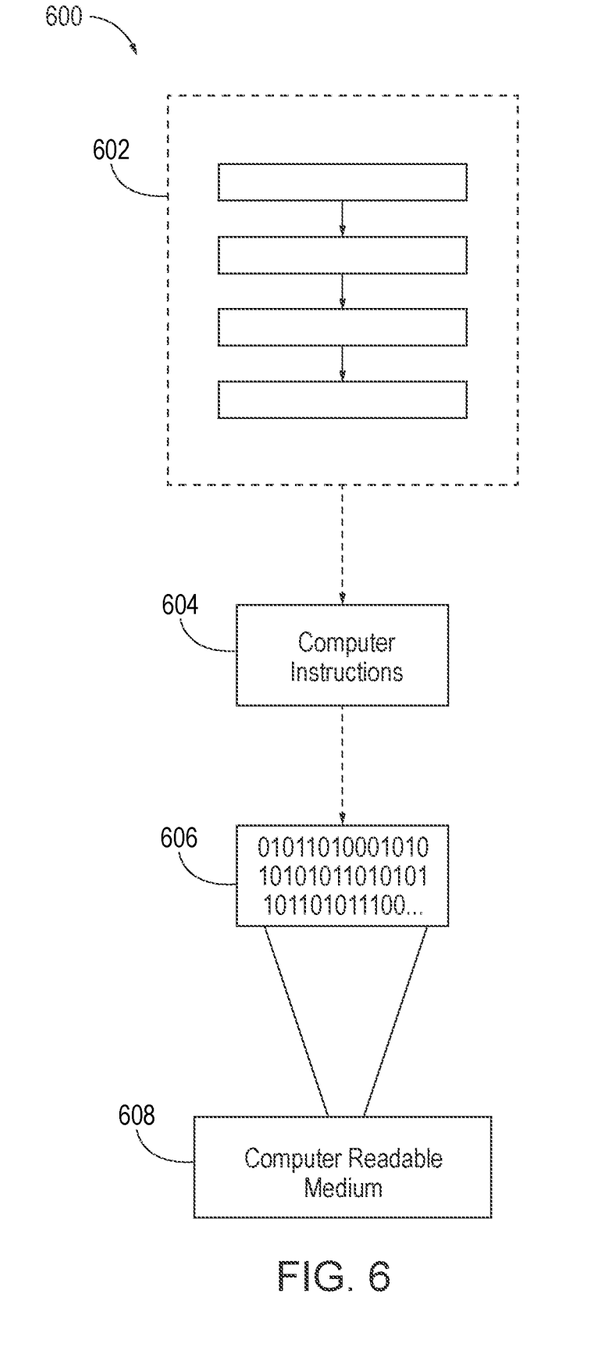
FIG. 6 is an illustration of an example computer-readable medium or computer-readable device including processor-executable instructions configured to embody one or more of the provisions set forth herein, according to one aspect.

Still another aspect of the systems and methods for charging station management involves a computer-readable medium including processor-executable instructions configured to implement one aspect of the techniques presented herein. An aspect of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein. In this implementation 600, the processor-executable computer instructions 604 may be configured to perform a method 602, such as the method 300 of FIG. 3 and the method 500 of FIG. 5. In another aspect, the processor-executable computer instructions 604 may be configured to implement a system, such as the operating environment of FIG. 2 and FIG. 4. Many such computer-readable media may be devised by those of ordinary skill in the art that are configured to operate in accordance with the techniques presented herein.

The term "computer readable media" as used herein includes computer storage media. Computer storage media includes volatile and nonvolatile, removable and non-removable media implemented in any method or technology for storage of information such as computer readable instructions or other data. Memory 214 and data store 216 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the SCD 206.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for managing charging station use, the system comprising:
  a request module configured to receive a reservation request from an account associated with a vehicle;
  a membership module configured to determine a membership benefit including one or more scheduling tiers corresponding to at least one scheduling option of a plurality of scheduling options and a rate tier of a plurality of rate tiers associated with the reservation request, wherein the membership benefit is based on a membership level of a plurality of membership levels, and wherein the plurality of scheduling options provide the account priority rights to access a charging station and each include a plurality of scheduling tiers;
  a schedule module configured to schedule a charging session based on the reservation request and the membership benefit; and
  a verification module configured to determine a voltage variation in a draw down process of the vehicle based on a voltage pattern of the charging station and verify the vehicle corresponding to the account is present at a charging station corresponding to the charging session by comparing the voltage variation to the account to identify the vehicle.

2. The system for managing charging station use of claim 1, wherein the plurality of scheduling options includes one or more of a number of charging sessions, charging duration, and booking window.

3. The system for managing charging station use of claim 2, wherein the number of charging sessions includes scheduling tiers of standard charging sessions and additional charging sessions of the plurality of scheduling tiers, wherein the charging duration includes scheduling tiers of standard charging length and additional charging length of the plurality of scheduling tiers, and wherein the booking window includes scheduling tiers of a standard booking window and a longer booking window of the plurality of scheduling tiers.

4. The system for managing charging station use of claim 1, wherein the membership level associated with the account is based on a purchase of a timeshare.

5. The system for managing charging station use of claim 4, wherein the timeshare includes a set of points, and wherein the membership level is commensurate with a subset of the set of points being redeemed in the reservation request.

6. The system for managing charging station use of claim 1, wherein the schedule module is further configured to approve or deny the reservation request based on the membership benefit.

7. The system for managing charging station use of claim 1, wherein the charging session corresponds to a parking area, and wherein the schedule module is further configured to transmit a notification to the account identifying a specific charging station prior to the charging session.

8. A method for managing charging station use, the method comprising:
receiving a reservation request from an account associated with a vehicle;
determining a membership benefit including one or more scheduling tiers corresponding to at least one scheduling option of a plurality of scheduling options and a rate tier of a plurality of rate tiers associated with the reservation request, wherein the membership benefit is based on a membership level of a plurality of membership levels, and wherein the plurality of scheduling options provide the account priority rights to access a charging station and each include a plurality of scheduling tiers;
scheduling a charging session based on the reservation request and the membership benefit;
determining a voltage variation in a draw down process of the vehicle based on a voltage pattern of the charging station; and
verifying the vehicle corresponding to the account is present at a charging station corresponding to the charging session by comparing the voltage variation to the account to identify the vehicle.

9. The method for managing charging station use of claim 8, wherein the plurality of scheduling options includes one or more of a number of charging sessions, charging duration, and booking window.

10. The method for managing charging station use of claim 9, wherein the number of charging sessions includes scheduling tiers of standard charging sessions and additional charging sessions of the plurality of scheduling tiers, wherein the charging duration includes scheduling tiers of standard charging length and additional charging length of the plurality of scheduling tiers, and wherein the booking window includes scheduling tiers of a standard booking window and a longer booking window of the plurality of scheduling tiers.

11. The method for managing charging station use of claim 8, wherein the membership level associated with the account is based on a purchase of a timeshare.

12. The method for managing charging station use of claim 11, wherein the timeshare includes a set of points, and wherein the membership level is commensurate with a subset of the set of points being redeemed in the reservation request.

13. The method for managing charging station use of claim 8, wherein the reservation request is approved based on the membership benefit.

14. The method for managing charging station use of claim 8, wherein the charging session corresponds to a parking area, the method further comprising transmitting a notification to the account identifying a specific charging station prior to the charging session.

15. A non-transitory computer readable storage medium storing instructions that when executed by a computer, which includes a processor to perform a method for managing charging station use, the method comprising:
receiving a reservation request from an account associated with a vehicle;
determining a membership benefit including one or more scheduling tiers corresponding to at least one scheduling option of a plurality of scheduling options and a rate tier of a plurality of rate tiers associated with the reservation request, wherein the membership benefit is based on a membership level of a plurality of membership levels, and wherein the plurality of scheduling options provide the account priority rights to access a charging station and each include a plurality of scheduling tiers;
scheduling a charging session based on the reservation request and the membership benefit;
determining a voltage variation in a draw down process of the vehicle based on a voltage pattern of the charging station; and
verifying the vehicle corresponding to the account is present at a charging station corresponding to the charging session by comparing the voltage variation to the account to identify the vehicle.

16. The non-transitory computer readable storage medium of claim 15, wherein the plurality of scheduling options includes one or more of a number of charging sessions, charging duration, and booking window.

17. The non-transitory computer readable storage medium of claim 16, wherein the number of charging sessions includes scheduling tiers of standard charging sessions and additional charging sessions of the plurality of scheduling tiers, wherein the charging duration includes scheduling tiers of standard charging length and additional charging length of the plurality of scheduling tiers, and wherein the booking window includes scheduling tiers of a standard booking window and a longer booking window of the plurality of scheduling tiers.

18. The non-transitory computer readable storage medium of claim 15, wherein the membership level associated with the account is based on a purchase of a timeshare.

19. The non-transitory computer readable storage medium of claim 15, wherein the reservation request is approved based on the membership benefit.

* * * * *